J. O'LEARY.
AUTOMOBILE FENDER.
APPLICATION FILED MAY 12, 1916.
1,191,818.
Patented July 18, 1916.
4 SHEETS—SHEET 1.
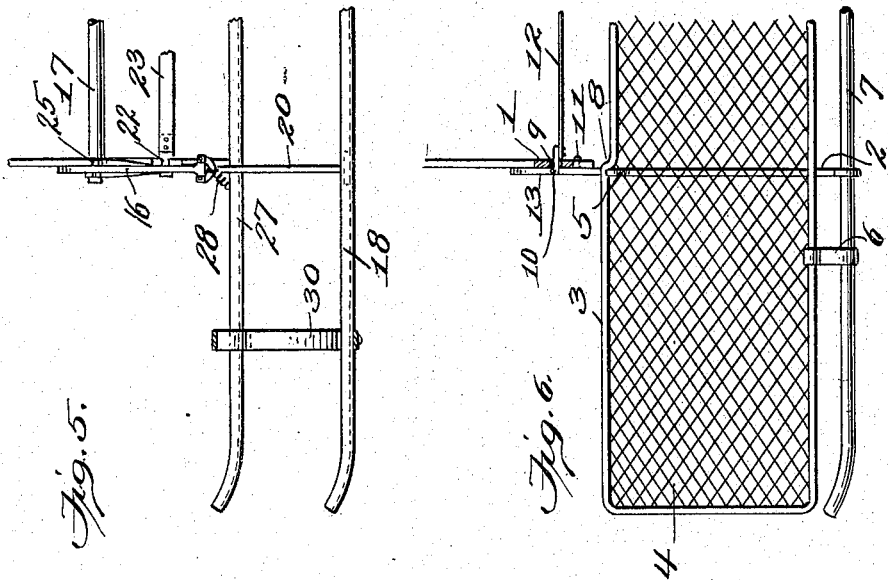
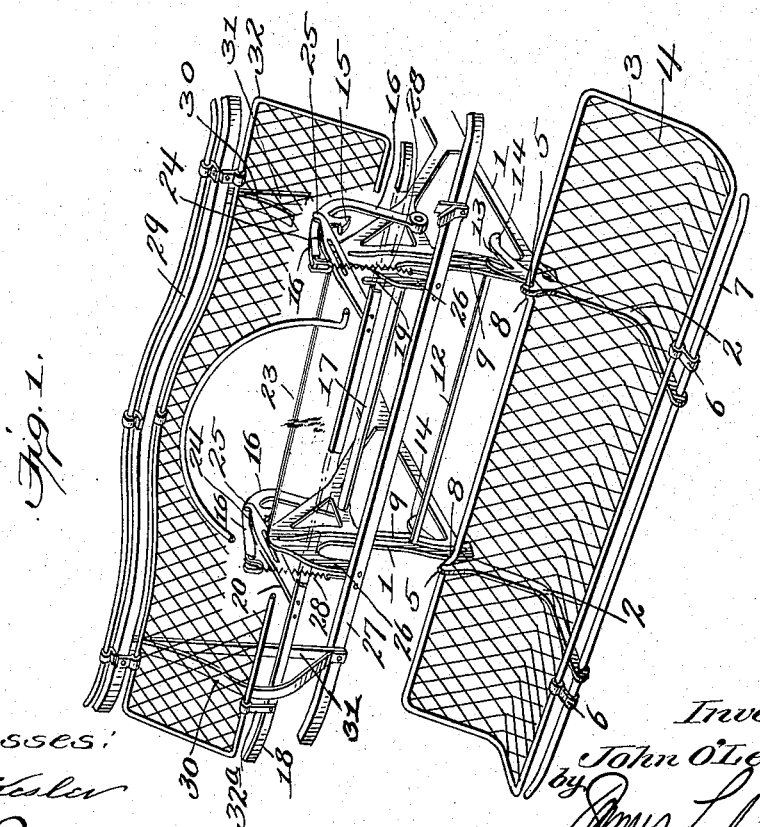
Witnesses:
Inventor
John O'Leary
by
Attorney

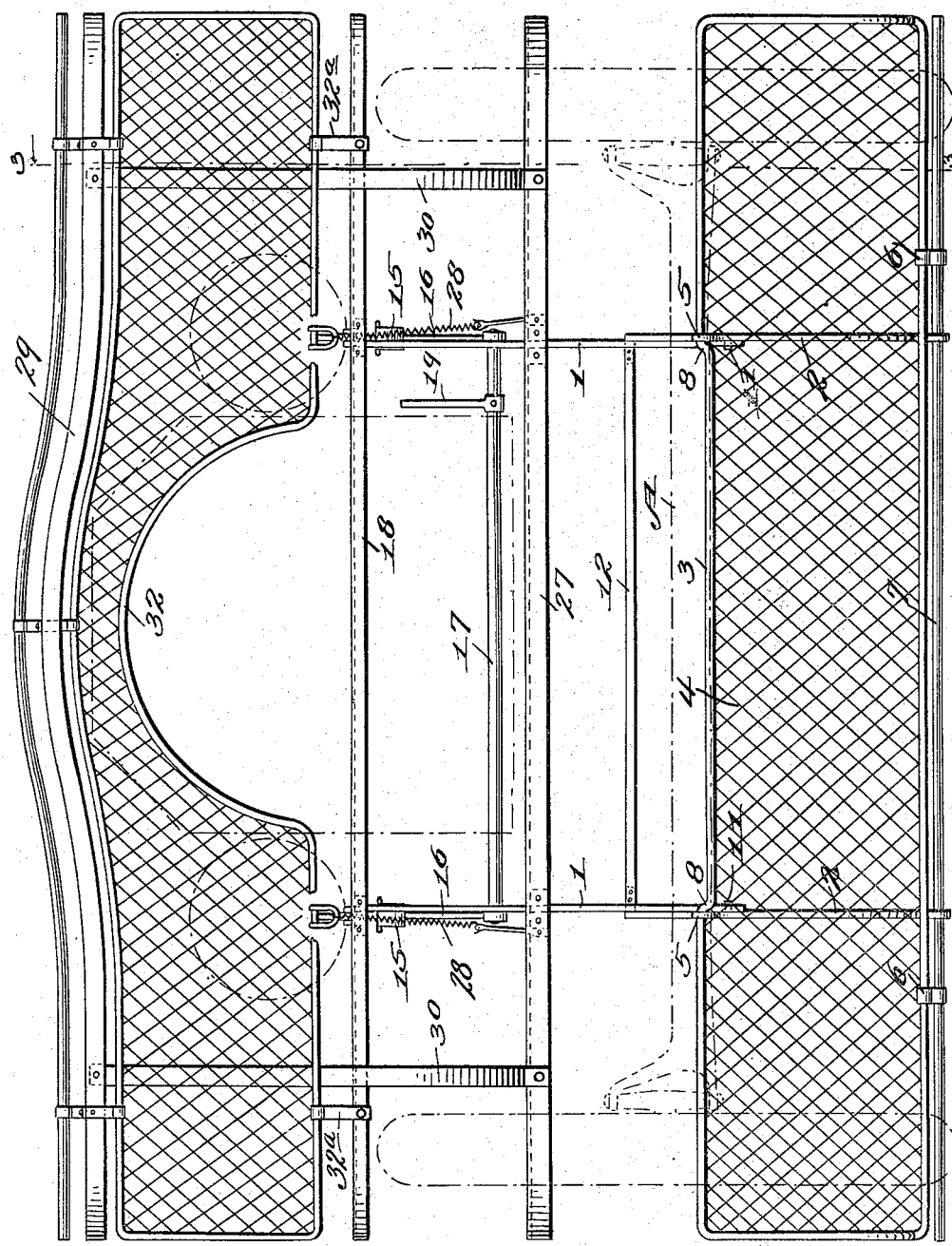

J. O'LEARY.
AUTOMOBILE FENDER.
APPLICATION FILED MAY 12, 1916.
1,191,818.
Patented July 18, 1916.
4 SHEETS—SHEET 3.
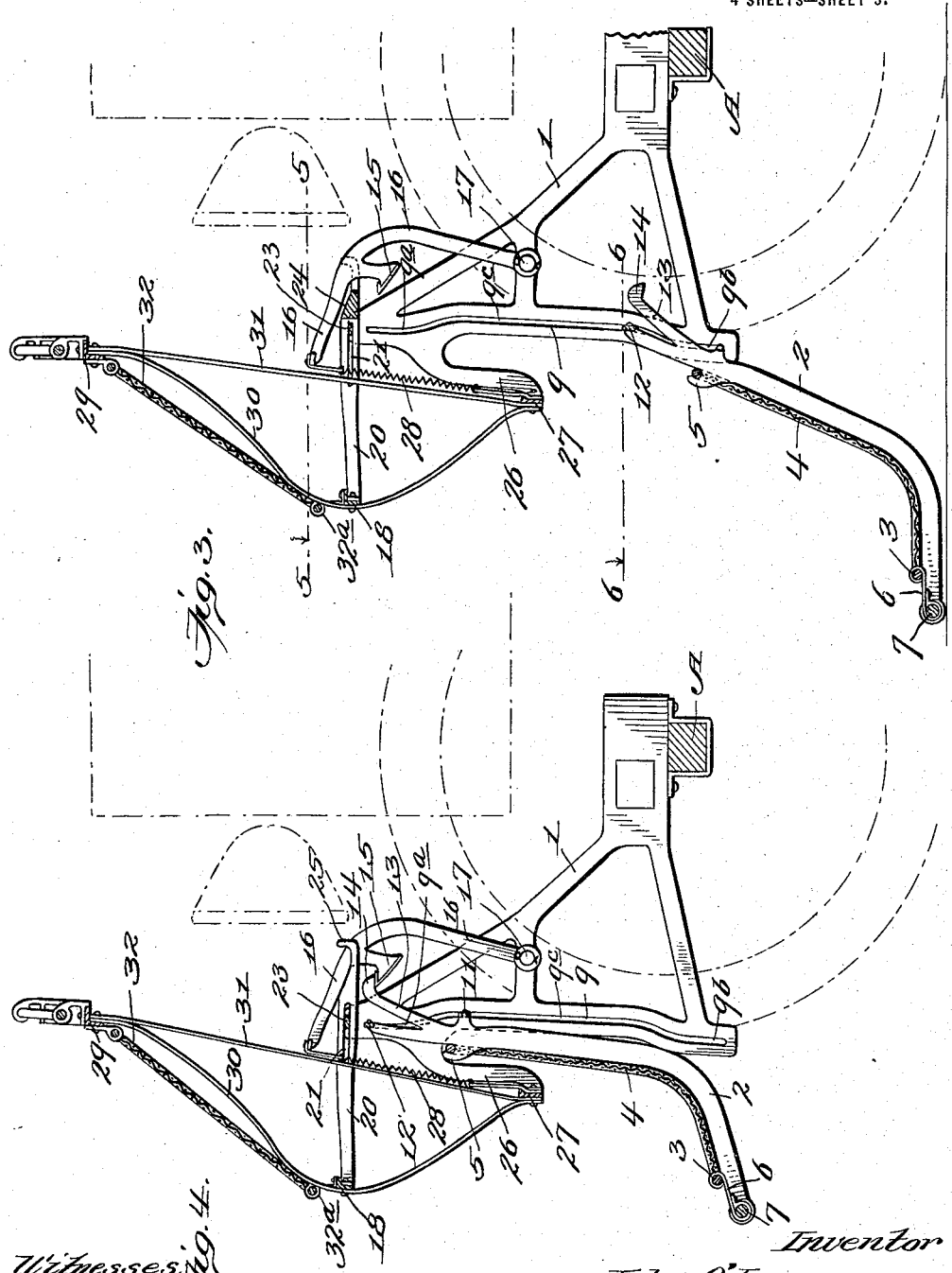
Witnesses
Inventor
John O'Leary
by
Attorney

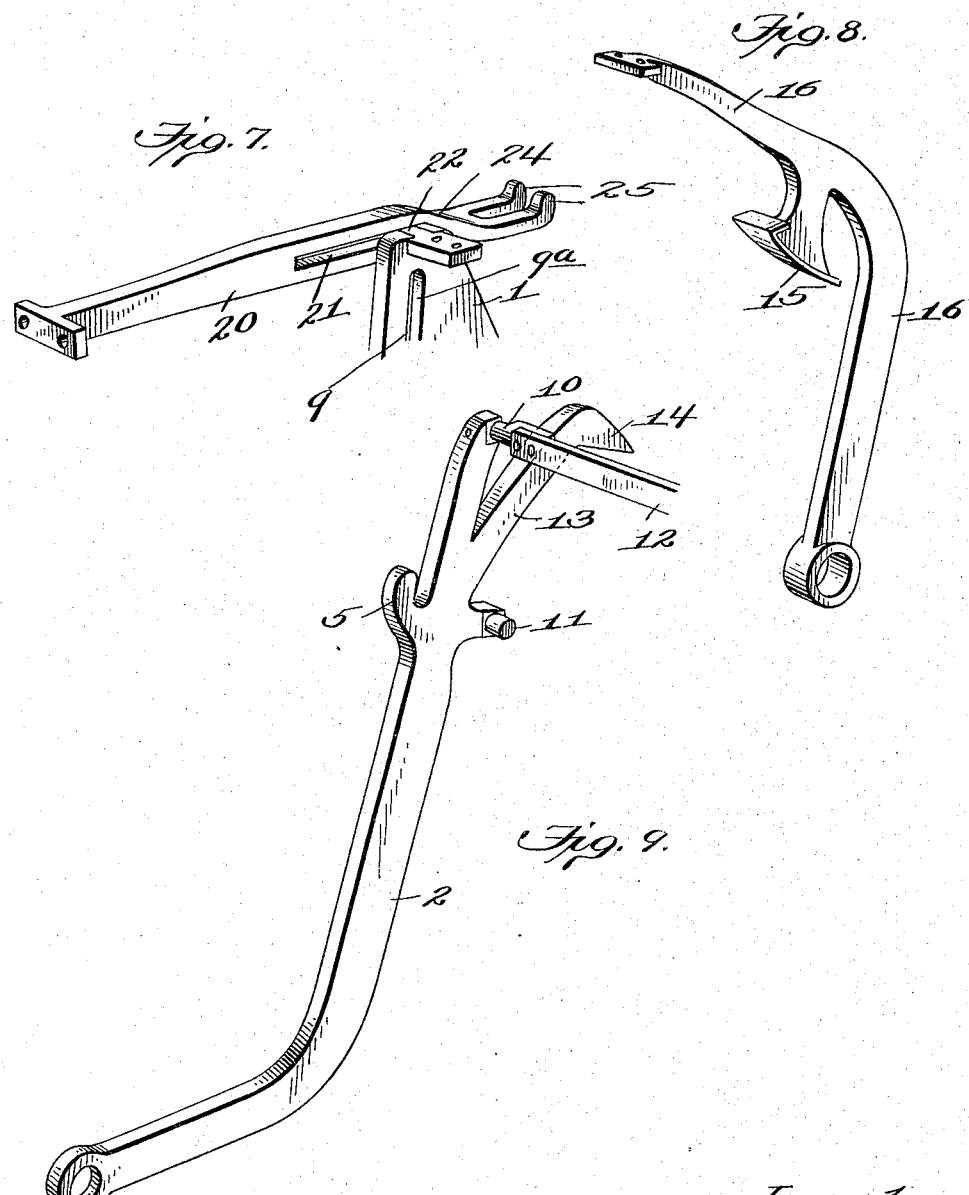

UNITED STATES PATENT OFFICE.

JOHN O'LEARY, OF COHOES, NEW YORK, ASSIGNOR OF THREE-EIGHTHS TO EDWARD PENROSE, OF COHOES, NEW YORK.

AUTOMOBILE-FENDER.

1,191,818.  Specification of Letters Patent.  Patented July 18, 1916.

Application filed May 12, 1916. Serial No. 97,113.

*To all whom it may concern:*

Be it known that I, JOHN O'LEARY, a citizen of the United States, residing at Cohoes, in the county of Albany, and State of New York, have invented new and useful Improvements in Automobile-Fenders, of which the following is a specification.

This invention relates to improvements in automobile fenders, proposing a construction of that type wherein the fender basket is normally supported in an elevated inoperative position by latching devices which are operable by the bumper when it engages an obstacle or by means actuated from within the car to release said basket and thereby to permit or provide for its movement into a projected operative position wherein it receives the obstacles.

The principal objects of the invention, briefly stated, are to provide a fender of the type stated which sits as close as possible to the engine hood or radiator and occupies a minimum space at the front of the car, yet, when operated, has an amply sufficient degree of forward projection; which is sensitively responsive to the actuation of the bumper and quick and certain in its operation; which protects the person struck, not only from getting under the wheels of the car, but also from striking against any part of the car; and is simple in construction and readily applicable to any automobile.

An embodiment of the invention is illustrated in the accompanying drawings, wherein:—

Figure 1 is a perspective view showing the fender basket in its lowered operative position. Fig. 2 is a front elevation. Fig. 3 is a vertical sectional view on the line 3—3 of Fig. 2. Fig. 4 is a view similar to Fig. 3 but showing the basket in its elevated inoperative position. Figs. 5 and 6 are detail longitudinal sectional views, respectively, on the lines 5—5 and 6—6 of Fig. 3. Fig. 7 is a detail perspective view of a slidable arm which actuates the latching parts to release the fender basket. Fig. 8 is a detail perspective view of a pivoted arm which forms an element of the latch organization. Fig. 9 is a detail perspective view of one of the members of the fender basket.

Similar characters of reference designate corresponding parts throughout the several views.

The fender basket and its associated operating parts are supported at the front of an automobile by a pair of brackets 1 which are rigidly secured, in any suitable manner, to the front axle A and project forwardly from said axle.

The fender basket includes a pair of side members 2 of general L-shape and which support a rectangular frame 3 for the fender fabric or mesh 4. For this purpose the upper bar of the frame 3 rests in hook-like lugs 5 at the front of the members 2 and the lower part of the frame 3 is connected by straps 6 to a bar 7 which extends between and connects the lower ends of the members 2. To prevent the frame 3 from having any lateral play relative to the members 2 the upper bar of said frame has a depressed central portion which provides shoulders 8 to bear against the members 2 at the inner sides thereof.

The members 2 are disposed adjacent the outer sides of and are slidably related to the brackets 1 which are constructed to provide guides for said members in their sliding movements. For this purpose the brackets 1 are provided with vertical slots 9 which extend between their side faces, and the members 2 are provided adjacent their rear edges with upper and lower laterally projecting guide pins 10 and 11 which work in the slots 9, the pins 10 being located at the upper ends of said members and the pins 11 being located suitably below the pins 10. The pins 10 project beyond the inner sides of the brackets 1 and are connected by a transverse tie rod 12. The slots 9 are specially formed to coact with the pins 10 and 11 in order to insure that the fender basket, when raised, shall sit as close to the hood as possible, and when lowered, shall have amply sufficient forward projection. For this purpose, said slots have upper and lower portions $9^a$ and $9^b$ which are arranged slightly in front of their central portions $9^c$ and are of less depth than the distance between the pins 10 and 11 of the members 2. When the fender basket is raised, the pins 10 are in the slot portions $9^a$ at or very near to the upper ends thereof, and the pins 11 are in the slot portions $9^c$, with the result that the forwardly directed lower part of the fender basket has a "retracted" position relative to the front of the car; and when the fender basket is lowered, the pins 11 are in the slot portions $9^b$ at the lower ends thereof and the pins 10 are in the slot portions 9ᶜ, with the result that the forwardly directed lower portion of the fender basket has a "projected" position relative to the front of the car.

For the purpose of supporting the fender basket in its elevated position, a latch organization is provided which includes arms 13 projecting rearwardly from the members 2 and formed with terminal lugs 14 and movable latch fingers 15 normally engaging under the lugs 14.

The latch fingers 15 are provided on and intermediate the ends of curved or inverted L-shaped arms 16 from which they depend. The arms 16 are mounted on a rock shaft 17 which has its bearings in the brackets 1; and in the operation of the fender, the arms 16 are moved rearwardly to disengage the fingers 15 from the lugs 14 and thereby permit the fender basket to drop from its normal elevated position, as shown in Fig. 4, to its lower operative position, as shown in Fig. 3, wherein the basket has a certain measure of forward projection as above explained.

The arms 16 may be operated to release the fender basket in either of two ways, viz., from within the car, or in consequence of the bumper bar 18 striking an obstacle, e. g. a person or animal. To provide for the operation of the arms 16 from within the car, the rock shaft 17 carries an arm 19 which may be linked in the well-known manner to a foot or hand lever (not shown) in proximity to the driver's seat.

The transverse bumper bar 18 is secured at the front ends of slidably mounted arms 20 which effect the rearward movement of the arms 16 when the bar 18 strikes an obstacle. The arms 20 are provided with longitudinal slots 21 and are supported from the brackets 1 by pins 22 carried by said brackets and projecting through the slots 21, said pins also serving to guide said arms in their sliding movements. The pins 22 project at each side of the brackets 1 and are preferably connected by a tie or brace rod 23. The arms 20 have portions of their upper faces formed as cams 24 to engage against the under faces of the arms 16 and effect the operation of said arms. The arms 20 have at their rear ends forks 25 which fit over the arms 16 and prevent any lateral play between the arms 20 and 16, thus insuring of the certainty of the operation of the arms 16 when the bar 18 engages an obstacle.

The brackets 1 are provided with forwardly directed goose-neck hangers 26 which carry a fixed transverse bumper bar 27. The arms 16 are held in their normal positions and against the cams 24 by springs 28 which connect the front ends of said arms and the bar 27.

To protect a person from striking his head against the radiator cap or other part at or near the top of the engine hood, an upper bumper bar 29 is provided which is preferably supported from the lower fixed bumper bar 27 by leaf springs 30 and 31 arranged in pairs near each side of the fender. The bar 29 preferably supports a frame 32 which carries fabric or mesh similar to that of the fender basket and prevents a person from striking his shoulders against the upper part of the hood or against the lamps or lamp brackets, and has its lower bar secured by straps 32ᵃ to the bumper bar 18. The frame 32 has its lower bar suitably spaced from the upper bar of the frame 3, when the fender basket is raised, and formed with a central arch to enable ready access from the front of the machine to the crank handle or radiator.

The springs 30 are bowed forwardly and are arranged in front of the springs 31 which are straight. The bumper bar 18 is connected to the springs 30 at or near their centers and, together with the arms 20, is held by said springs in a normal position from which it is deflected rearwardly by impact with an obstacle.

The bar 29 being resiliently supported by the springs 30 and 31 is yieldable under impact with an obstacle but, normally, too free a yielding or vibratory play of said bar is prevented by the counteracting effect of each pair of springs 30 or 31, as the case may be, on the other.

When the bar 18 strikes an obstacle, it is pushed rearward for a short distance, and in its rearward movement carries with it the arms 20 which thereby actuate the arms 16 to release the fender basket, as described. When the fender basket is released, it quickly and freely drops by gravity into its lower projected position wherein it catches the person, animal or other obstacle.

The lugs 14 have their upper faces formed as cams to ride past the fingers 15 when the fender basket is restored to its normal position; and in raising the fender, as soon as the lugs 14 have passed above the fingers 15, the arms 16 are moved forward by their springs 28 to engage their fingers 15 under the lugs 14.

While I have shown and specifically described a single embodiment of the invention, it will be understood that the invention includes within its scope such modifications as may fall within the terms of the appended claims.

I claim as my invention:—

1. In an automobile fender, in combination, a pair of supporting brackets, and a fender basket including a pair of members which adjoin the respective brackets and are vertically slidable relatively thereto, the brackets and members having devices rigid therewith coacting as guides during the sliding movements of said members whereby the fender basket when in its upper position is retracted and when in its lower position is projected.

2. In an automobile fender, in combination, a pair of supporting brackets, and a fender basket including a pair of members which adjoin and form companions of the respective brackets, the members being vertically slidable relatively to the brackets, one of said companion elements having a pair of pins and the other having a slot through which the pins project and which is shaped to coact with the pins in holding the fender basket retracted when elevated and projected when lowered.

3. In an automobile fender, in combination, a pair of supporting brackets, and a fender basket including a pair of members which adjoin the brackets and are vertically slidable relatively thereto, the brackets having vertical slots with upper and lower portions thereof forwardly offset from the intermediate portions and the members each having upper and lower pins for engagement in said slots with their spacing from one another greater than the lengths of said offset portions.

4. In an automobile fender, in combination, a pair of supporting brackets, a vertically slidable fender basket including a pair of members which adjoin the brackets and coact with them as guides, said members having rearwardly directed arms provided with terminal lugs and movable latch fingers engaging said lugs to support the fender basket in an elevated position.

5. In an automobile fender, in combination, a pair of supporting brackets, a vertically slidable fender basket including a pair of members which adjoin the brackets and coact with them as guides, said members having rearwardly directed arms provided with terminal lugs, latch fingers engaging said terminal lugs, bumper means spring-held in a normal position, and slidable arms guided by said brackets and actuated by said bumper means for moving said latch fingers to disengage said lugs.

6. In an automobile fender, in combination, a pair of supporting brackets, a vertically slidable fender basket including a pair of members which adjoin the brackets and coact with them as guides, said members having rearwardly directed arms provided with terminal lugs, pivoted arms provided with latch fingers to engage under said terminal lugs, arms slidably mounted and engaging under said pivoted arms to effect rearward movement thereof, and spring-held bumper means connected to said slidably mounted arms.

7. In an automobile fender, in combination, a pair of supporting brackets, a vertically slidable fender basket including a pair of members which adjoin the brackets and coact with them as guides, said members having rearwardly directed arms provided with terminal lugs, pivoted arms provided with latch fingers to engage under said terminal lugs, arms slidably mounted on the brackets and formed with cams to engage under said pivoted arms and with forked rear ends to fit over said pivoted arms, and spring-held bumper means connected to said slidably mounted arms.

8. In an automobile fender, in combination, a pair of arms mounted for rearward sliding movement, spring-held bumper means connected to said arms, pivoted arms for engagement by said slidable arms, a movable fender basket, and latch fingers provided on said pivoted arms to normally support said basket in an inoperative position.

9. In an automobile fender, in combination, a pair of arms mounted for rearward sliding movement, spring-held bumper means connected to said arms, the latter having cam faces and rear terminal forks, pivoted arms yieldably held against said cam faces and fitting within said forks, a movable fender basket, and latch fingers provided on said pivoted arms to normally support said basket in an inoperative position.

10. In an automobile fender, in combination, a pair of brackets, a vertically slidable fender basket including a pair of members which adjoin the brackets and coact with them as guides, horizontally slidable arms mounted on the brackets, spring-held bumper means connected to said arms, and latch means coöperating with said members and operable by said arms to disengage them.

11. In an automobile fender, in combination, an upper bumper bar, front and rear leaf springs supporting said bar at their upper ends, the front springs being bowed forwardly, a second bumper bar connected to the front springs near the center thereof, a movable fender basket, and means connected to said second bumper bar for controlling the operation of said fender basket.

12. In an automobile fender, in combination, an upper bumper bar, front and rear leaf springs supporting said bar at their upper ends, the front springs being bowed forwardly, a second bumper bar connected to the front springs near the center thereof, a pair of brackets, a fixed lower bumper bar supported by the brackets and from which the leaf springs are upright, a movable fender basket, and means slidably mounted on said brackets and connected to said bumper bar for controlling the operation of said fender basket.

13. In an automobile fender, in combination, a fixed bumper bar, a movable bumper bar arranged above said fixed bar, leaf springs supporting said movable bar from said fixed bar, a movable fender basket, and means connected to said movable bar for controlling the operation of said fender basket.

In testimony whereof I have hereunto set my hand in presence of two subscribing witnesses.

JOHN O'LEARY.

Witnesses:
JAMES H. PENROSE,
CHARLES F. LAND.